United States Patent
Jouppi et al.

(10) Patent No.: US 8,732,368 B1
(45) Date of Patent: May 20, 2014

(54) CONTROL SYSTEM FOR RESOURCE SELECTION BETWEEN OR AMONG CONJOINED-CORES

(75) Inventors: Norman Paul Jouppi, Palo Alto, CA (US); Parthasarathy Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1597 days.

(21) Appl. No.: 11/061,959

(22) Filed: Feb. 17, 2005

(51) Int. Cl.
*G06F 12/00* (2006.01)

(52) U.S. Cl.
USPC .......................................................... 710/240

(58) Field of Classification Search
USPC ................. 710/52, 104, 107, 74, 113–125, 710/240–244; 709/238, 245, 253; 711/147, 711/100, 118, 130; 370/462, 257, 489; 713/2, 300; 718/104, 105; 712/32–34
See application file for complete search history.

(56) References Cited

U.S. PATENT DOCUMENTS

| | | | | |
|---|---|---|---|---|
| 3,665,404 A | * | 5/1972 | Werner | 710/262 |
| 3,913,070 A | * | 10/1975 | Malcolm et al. | 718/104 |
| 4,080,649 A | * | 3/1978 | Calle et al. | 710/48 |
| 4,633,394 A | * | 12/1986 | Georgiou et al. | 710/240 |
| 4,783,736 A | * | 11/1988 | Ziegler et al. | 711/130 |
| 4,924,220 A | * | 5/1990 | Mihara et al. | 710/240 |
| 4,928,234 A | * | 5/1990 | Kitamura et al. | 711/151 |
| 4,979,106 A | * | 12/1990 | Schneider | 713/1 |
| 5,197,130 A | * | 3/1993 | Chen et al. | 712/3 |
| 5,283,903 A | * | 2/1994 | Uehara | 710/200 |
| 5,452,463 A | * | 9/1995 | Parks et al. | 710/200 |
| 5,526,495 A | * | 6/1996 | Shibata et al. | 710/307 |
| 5,603,029 A | * | 2/1997 | Aman et al. | 718/105 |
| 5,621,897 A | * | 4/1997 | Boury et al. | 710/116 |
| 5,829,029 A | * | 10/1998 | Shelly et al. | 711/133 |
| 5,905,897 A | * | 5/1999 | Chou et al. | 710/260 |
| 5,918,057 A | * | 6/1999 | Chou et al. | 710/260 |
| 6,148,395 A | | 11/2000 | Dao et al. | |
| 6,212,604 B1 | | 4/2001 | Tremblay | |
| 6,233,645 B1 | * | 5/2001 | Chrysos et al. | 710/244 |
| 6,240,508 B1 | | 5/2001 | Brown, III et al. | |
| 6,246,256 B1 | * | 6/2001 | Liu et al. | 326/38 |
| 6,295,553 B1 | * | 9/2001 | Gilbertson et al. | 709/207 |
| 6,341,347 B1 | * | 1/2002 | Joy et al. | 712/228 |
| 6,389,497 B1 | * | 5/2002 | Koslawsky et al. | 710/242 |
| 6,442,631 B1 | * | 8/2002 | Neufeld et al. | 710/107 |
| 6,473,087 B1 | * | 10/2002 | Tsang | 345/505 |
| 6,526,462 B1 | * | 2/2003 | Elabd | 710/242 |
| 6,532,509 B1 | * | 3/2003 | Wolrich et al. | 710/240 |
| 6,651,125 B2 | * | 11/2003 | Maergner et al. | 710/244 |

(Continued)

FOREIGN PATENT DOCUMENTS

GB 2357863 A * 7/2001 .............. G06F 9/46

OTHER PUBLICATIONS

"Resource management in software-programmable router operating systems" by Yan et al. (abstract only) Publication Date: Mar. 2001.*

(Continued)

*Primary Examiner* — Paul R Myers

(57) ABSTRACT

A processing system is provided including sharing a resource in a processor system for processing signals, the processor system having first and second conjoined-cores, and selecting the conjoined-core having control over the resource based on arbitration between the first and second conjoined-cores.

13 Claims, 6 Drawing Sheets

(56) References Cited

U.S. PATENT DOCUMENTS

| | | | |
|---|---|---|---|
| 6,697,873 B1* | 2/2004 | Yik et al. | 709/238 |
| 6,718,457 B2 | 4/2004 | Tremblay et al. | |
| 6,725,354 B1 | 4/2004 | Kahle et al. | |
| 6,745,293 B2* | 6/2004 | Lasserre et al. | 711/131 |
| 6,813,665 B2* | 11/2004 | Rankin et al. | 710/260 |
| 7,055,060 B2* | 5/2006 | Nguyen et al. | 714/11 |
| 7,058,767 B2* | 6/2006 | Dodson et al. | 711/137 |
| 7,352,741 B2* | 4/2008 | Eberle et al. | 370/389 |
| 7,380,038 B2* | 5/2008 | Gray | 710/243 |
| 7,380,039 B2* | 5/2008 | Miloushev et al. | 710/244 |
| 7,441,087 B2* | 10/2008 | Hakura et al. | 711/137 |
| 7,444,639 B2* | 10/2008 | Jahnke | 718/105 |
| 2003/0005380 A1* | 1/2003 | Nguyen et al. | 714/736 |
| 2004/0210738 A1* | 10/2004 | Kato et al. | 712/1 |
| 2006/0123152 A1* | 6/2006 | Koch et al. | 710/22 |
| 2006/0123251 A1* | 6/2006 | Nakajima et al. | 713/300 |
| 2006/0136640 A1* | 6/2006 | Tuan | 710/260 |
| 2006/0155792 A1* | 7/2006 | Inoue et al. | 707/206 |
| 2006/0179196 A1 | 8/2006 | Gray | |

OTHER PUBLICATIONS

Proceedings of 37th International Symposium on Microarchitecture, Dec. 2004, Conjoined core Chip Multiprocessing.*

CASH: Revisiting hardware sharing in single-chip parallel processing, Dec. 2002, by Dolbeau and Seznec.*

Dolbeau, Romain and Seznec, Andre, "CASH: Revisiting hardware sharing in single-chip parallel processor", Institut National de Recherche en Informatique et en Automatique, No. 1660, Dec. 2002, Rennes, France.

Kumar et al., Conjoined-Core Chip Multiprocessing, 37th International Symposium on Microarchitecture, IEEE, Dec. 4-8, 2004, pp. 1-12.

Rakesh Kumar, Holistic Design for Multi-core Archirtectures, Dissertation, Obviating Overprovisioning Conjoined-core Multiprocessing Architectures, pp. 107-134, 2006.

U.S. Appl. No. 11/061,696, Office Action dated Mar. 23, 2007, pp. 1-4 and attachments.

U.S. Appl. No. 11/061,696, Office Action dated Jan. 2, 2008, pp. 1-4 and attachments.

U.S. Appl. No. 11/061,696, Final Rejection dated Aug. 22, 2008, pp. 1-8 and attachments.

U.S. Appl. No. 11/061,696, Office Action dated Apr. 30, 2009, pp. 1-8.

U.S. Appl. No. 11/061,696, filed Feb. 17, 2005 (pp. 1-22).

* cited by examiner

CONTROL SYSTEM FOR RESOURCE SELECTION BETWEEN OR AMONG CONJOINED-CORES

CROSS-REFERENCE TO RELATED APPLICATION(S)

The present application contains subject matter related to a concurrently filed U.S. patent application by Norman P. Jouppi and Parthasarathy Ranganathan entitled "CONJOINED-CORE CHIP MULTIPROCESSOR SHARED RESOURCE SYSTEM". The related application is assigned to Hewlett-Packard Development Company, LP and is identified by U.S. application Ser. No. 11/061,696.

TECHNICAL FIELD

The present invention relates generally to multiprocessor systems, and more particularly, chip multiprocessor systems.

BACKGROUND ART

As the number of transistors available on a die has been increasing in accordance with Moore's Law and the development of general purpose processors features a long execution pipeline and a superscalar execution core, the efficiency of transistor utilization in mainstream processor architectures has been decreasing. At some point, given increased transistor counts, increases in processor performance will level out and only minor improvements will be possible. This expectation has stimulated much research. One way to improve performance has been by developing multiprocessor architectures, including single-chip multiprocessors (CMP). Another way to improve the efficiency of large out-of-order processors is to run more than one thread on each processor with multithreading, for example simultaneous multithreading (SMT).

The CMP and SMT approaches to increased efficiency appear to be two extremes of a viable design spectrum. Most CMP approaches use relatively simple processors, which have higher inherent efficiency. SMT processors are usually larger and more complex, resulting in lower single-threaded efficiency, but share almost all processor resources between threads to increase efficiency.

Between these two extremes, it is possible to have a range of processors sharing varying degrees of hardware between threads. At the end of the range closest to CMPs, pairs of modestly more complex processors could be designed to share a few common components. At the end of the range closest to SMTs, processors could be designed that possess private copies of particular critical resources.

In the past, some systems shared second-level caches, branch predictors, and divide/square root hardware, but sharing these functional units incurred significant performance loss, which resulted in complications in the sharing scheduling.

DISCLOSURE OF THE INVENTION

The present invention provides a processing system including sharing a resource in a processor system for processing signals, the processor system having first and second conjoined-cores, and selecting the conjoined-core having control over the resource based arbitration between the first and second conjoined-cores.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

In the following description, numerous specific details are given to provide a thorough understanding of the invention. However, it will be apparent to one skilled in the art that the invention may be practiced without these specific details. In order to avoid obscuring the present invention, some well-known circuits and system configurations are not disclosed in detail. Similarly, the system processes signals, which are the physical process steps that transform one physical, electrical signal into another.

Likewise, the drawings showing embodiments of the apparatus are semi-diagrammatic and not to scale and, particularly, some of the dimensions are for the clarity of presentation and are shown exaggerated in the FIGs.

Between the two approaches of single-chip multiprocessors (CMP) and simultaneous multithreading (SMT) to increase efficiency, it has been discovered that there are several benefits to sharing hardware between more than one processor or thread. Time-sharing a lightly-utilized resource saves area, increases efficiency, and reduces leakage. Dynamically sharing a large resource can also yield better performance than having distributed small private resources, statically partitioned.

Further, it has been discovered that a processor system can be integrated to have multiple cores that are "conjoined", which as defined herein means that they are integral with each other without a memory interconnection network between the conjoined-cores in a single processor system. Previously, cores were individual cores joined together by a memory interconnection network to share resources for processing signals.

Figure 1:
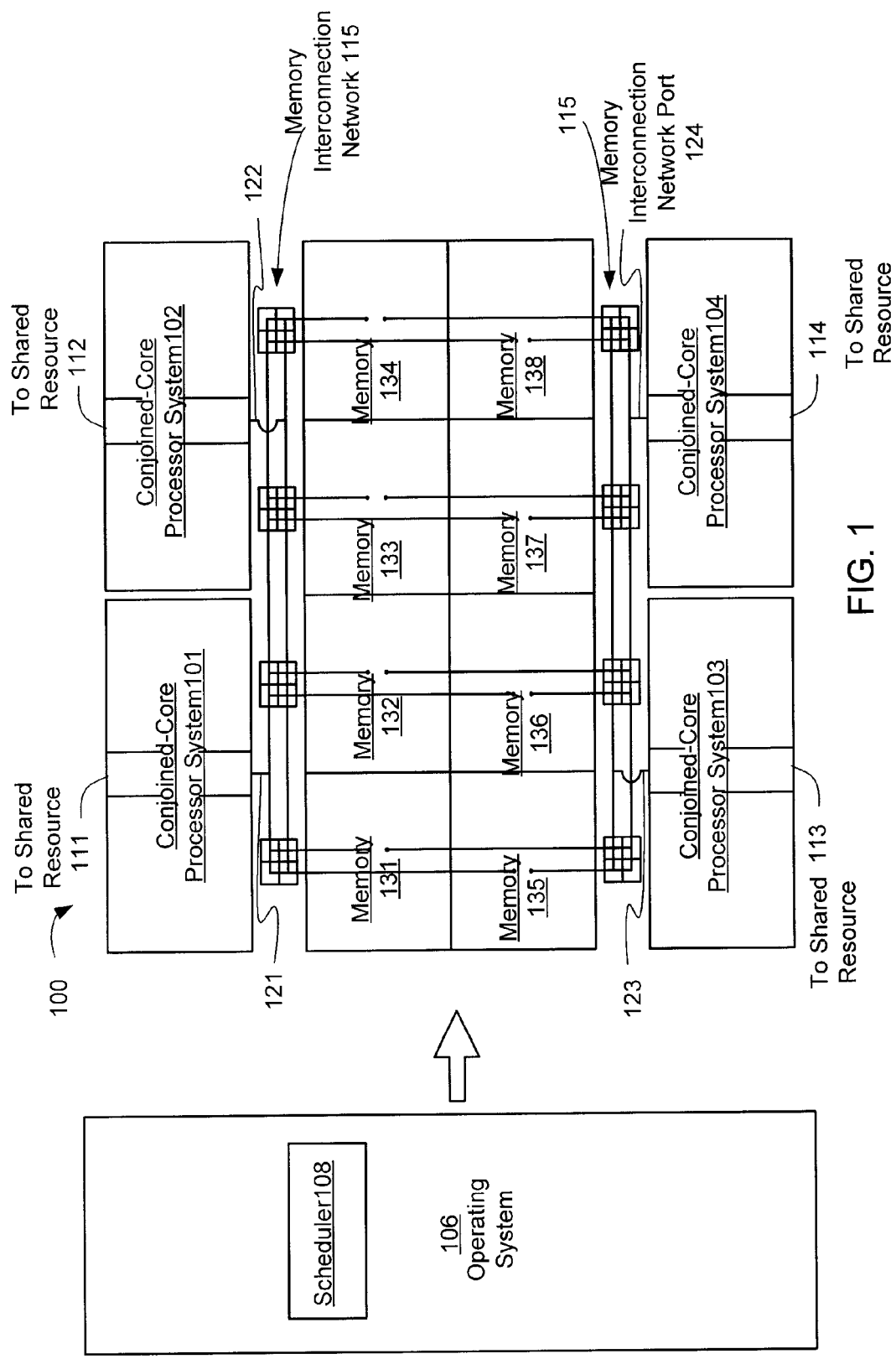
FIG. 1 is a block diagram of a conjoined-core chip multiprocessor (CMP) system in accordance with an embodiment of the present invention.

Referring now to FIG. 1, therein is shown a block diagram of a conjoined-core chip multiprocessor (CMP) system 100 in accordance with an embodiment of the present invention. The conjoined-core CMP system 100, for example, has a number of processors, such as conjoined-core processor systems 101 through 104 sharing signals, and is controlled by an operating system 106 containing a scheduler 108.

The conjoined-core processor systems 101 through 104 have shared resources 111 through 114.

The shared resources 111 through 114 are respectively connected to a memory interconnection network 115 by memory interconnection network ports 121 through 124, respectively.

The memory interconnection network ports 121 through 124 are respectively connected by the memory interconnection network 115 to other resources that may be shared, such as L2 and higher caches/memories (memories) 131 through 138 and other conjoined-core processor systems.

The selective sharing includes, but is not limited to, sharing based on: topology, frequency of use, latency, contention avoidance, or a combination thereof.

Topology is a significant factor in determining what resources are feasible to share and what the area, complexity, and performance costs of sharing are. In general, resources to be shared should be large enough that the additional wiring needed to share them does not outweigh the area benefits obtained by sharing. Thus, different embodiments of the present invention contemplate sharing of resources such as floating point units (FPUs), memory interconnection network ports, first-level instruction caches, and first-level data caches between conjoined processor systems.

Frequency of use as a criteria combines resources that see high use from one core and low use from another core.

Latency of operation as a criteria combines resources that will result in the lowest latency of operation of the combined cores.

Contention avoidance as a criteria combines resources that will result in the greatest access to the combined resource for both cores without interference.

It will be understood that combinations of the sharing bases can be used for any given conjoined-core processor system.

There are many ways that the shared resources can be allocated to the conjoined-core processor systems 101 through 104, such as fixed allocation sharing based on one conjoined-core processor system having access to the resources during odd cycles and the other having access to the resources during even cycles. However there are many possibilities for intelligent allocation sharing even when taking into account the constraints imposed by long-distance on-chip communication. The various embodiments of the present invention will operate even when core-to-core delays are too long to enable cycle-by-cycle arbitration of any shared resource.

The intelligent allocation sharing includes arbitration, which is based on sharing, assertion, workload analysis, service level agreement (SLA), or a combination thereof.

The various embodiments of the present invention also contemplate having the best shared resource with a different organization than an unshared resource. For example, fetch-directed prefetching may be more effective in the context of a shared cache that exhibits higher latency than in an unshared cache design. Similarly, banking may be more important for shared memory structures than unshared memory structures.

The conjoined-core processor systems 101 through 104 can also be useful in applications where enhanced reliability is important. While it is relatively easy to make memory structures error tolerant to soft errors through techniques such as error correcting codes (ECC), providing integrated error checking of computational structures is usually prohibitively complex. Depending on application needs, the conjoined-core processor systems 101 through 104 have the flexibility to either execute a single thread in tandem for highly reliable operation, or could execute different threads for higher performance. This means that if non-memory resources were shared, execution by the two conjoined-cores would likely be offset by a cycle, and so the occurrence of transient errors in the conjoined-cores would still be independent for each execution instance.

Various embodiments of the present invention provide a significant reduction in per-core area. In a CMP, reduced per-core area can have two first-order effects on performance. First, it allows more conjoined-cores to be placed on a single chip. Second, it allows faster communication between conjoined-cores that are now packed more tightly (for example, explicit chip-to-chip communication will be faster, or higher-level cache access times will be lower, as each conjoined-core sharing the resource is closer to it).

For the conjoined-core CMP system 100, there are four embodiments using instruction cache sharing, data cache sharing, memory interconnection network port sharing, and FPU sharing. For each kind of sharing, two conjoined-cores share the hardware structure of the shared resources 111 through 114. The usage of the shared resources 111 through 114 can be based on a policy decided either statically, such that it can be accessed only during fixed cycles by a certain conjoined-core, or the accesses can be determined based on certain dynamic conditions visible to both conjoined-cores. The initial mechanisms all work with even the simplest and most naive static scheduling, where one of the conjoined-cores gets access to the shared resource during odd cycles while the other conjoined-core gets access during even cycles.

Figure 2:
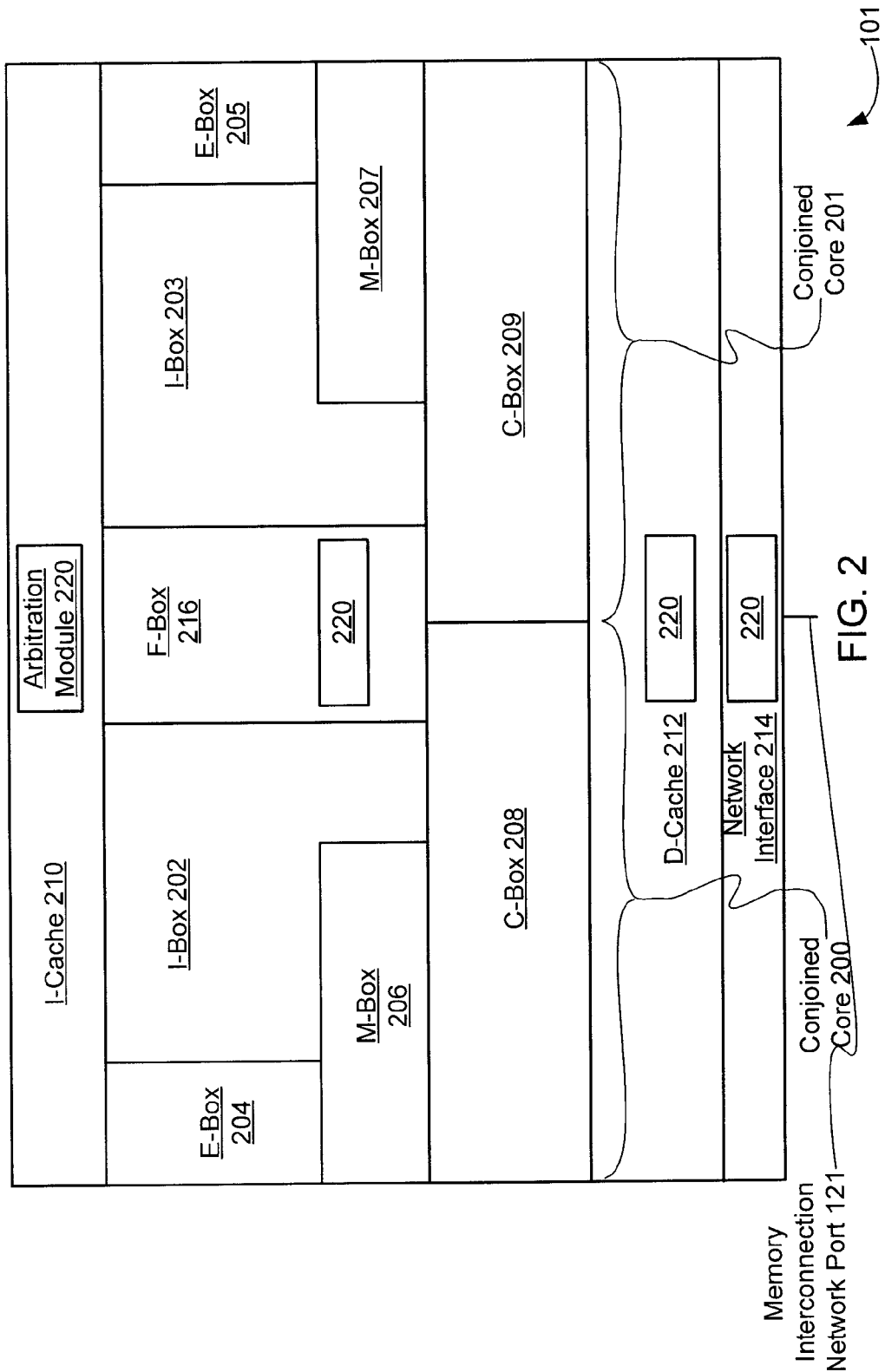
FIG. 2 is a block diagram of a conjoined-core processor system.

Referring now to FIG. 2, therein is shown a block diagram of the conjoined-core processor system 101 as an example. The conjoined-core processor system 101 has first and second conjoined-cores 200 and 201 conjoined with each other without a memory interconnection network between them.

The first and second conjoined-cores 200 and 201 respectively comprise instruction units (I-Boxes) 202 and 203, execution units (E-Boxes) 204 and 205, memory management units (M-Boxes) 206 and 207, and cache controller units (C-Boxes) 208 and 209.

The I-Boxes 202 and 203 each fetch and decode machine level instructions, one per cycle, parse the operand specifiers, and then fetch the operand. The E-Boxes 204 and 205, which include register files and arithmetic logic units (ALUs), each executes the data or address manipulation commanded by the instructions. The M-Boxes 206 and 207 each receive instruction read and data read requests from the I-Boxes 202 and 203, and each receives data read or write requests from the E-Boxes 204 and 205. The C-Box 208 and 209 each handle accesses to cache or main memories.

The first and second conjoined-cores 200 and 201 respectively share and are conjoined to share resources such as a L1 instruction cache (I-Cache) 210, a L1 data cache (D-Cache) 212, a network interface 214, and a floating point unit (F-Box) 216. The shared resources each include an arbitration module 220 to arbitrate whether the first, second, or both conjoined-cores use the shared resource.

The I-Cache 210 is a two-way associative cache and implements sharing between the first and second conjoined-cores 200 and 201 by having a shared fetch path between the I-Cache 210 and the first and second conjoined-cores 200 and 201. Because the layout of cache memories are a function of the number of rows and columns, the number of columns is increased but the number of rows is decreased in the I-Cache 210. This gives a wider aspect ratio that can span two conjoined-cores.

As mentioned, the I-Cache 210 is time-shared every other cycle. In one embodiment where a double fetch-width is used, the fetch width is changed to eight instructions every other cycle (compared to four instructions every cycle in the unshared case). The time-averaged effective fetch bandwidth (ignoring branch effects) remains unchanged. In a second embodiment, a single fetch-width is used so the effective per-core fetch bandwidth is halved. In a third embodiment, a banked architecture is used, where conjoined-cores can fetch four instructions every cycle, but only if the conjoined-core's designated bank is allocated to it that cycle.

In the double fetch-width embodiment, sharing results in a wider instruction fetch path, wider multiplexers, and extra instruction buffers before decode for the instruction front end with an increase in the access latency by one cycle. The double fetch width solution also results in higher power consumption per fetch. Since longer fetch blocks are more likely to include taken branches out of the block, the fetch efficiency is somewhat reduced.

The D-Cache 212 is also a two-way associative cache and implements sharing between the first and second conjoined-cores 200 and 201. Even though the D-Cache 212 occupies a significant area, D-Cache sharing is not an obvious candidate for sharing because of its relatively high utilization. However, it has been discovered that some additional structures/techniques can be used in conjunction with various embodiments of the present invention to minimize the performance impact due to sharing as will later be disclosed. Each conjoined-core can issue memory instructions only every other cycle. Sharing entails lengthened wires that increase access latency slightly. This latency may be hidden in the processor system's pipeline.

The memory interconnection network 115 of FIG. 1 occupies a significant fraction of the die area of the conjoined-core CMP system 100. The configuration and complexity of the memory interconnection network is strongly tied to the number of conjoined-cores. It has been discovered that by sharing a single memory interconnection network port between two conjoined-cores, the configuration and complexity can be greatly reduced; e.g., the conjoined-cores 200 and 201 sharing the memory interconnection network port 121. This halves the number of rows (or columns) in the memory interconnection network resulting in linear area savings. Memory interconnection network port sharing provides that one of the two conjoined-cores can issue a request to a particular memory bank in a given cycle.

Again, one of the conjoined-cores issued requests to a memory bank on odd cycles while the other conjoined-core can issue requests only every even number of cycles.

When the I-Cache and D-Cache are already shared between two conjoined-cores, sharing the memory interconnection network port between the same two conjoined-cores is very straightforward since the conjoined-cores have already been joined together at the shared resource before reaching the memory interconnection network port.

The F-Box 216 is shared between the first and second conjoined-cores 200 and 201. Since processor system floorplans often have the F-Box on one side and the integer datapath on the other side, by mirroring adjacent conjoined-cores (to be mirror images of each other), this topology based sharing presents minimal disruption to the floor plan. Thus, the F-Box 216 is in the center of the conjoined-core CMP 101 and the E-Boxes 204 and 205 are on the outside edges of the conjoined-core CMP 101.

For the design of a resource-sharing core, the floorplan must be co-designed with the architecture, otherwise the architecture may specify sharings that are not physically possible or have high communication costs. In general, shared resources should be large enough that the additional wiring needed to share them does not outweigh the area benefits obtained by sharing.

In one embodiment, each conjoined-core can issue floating-point instructions to the floating-point sub-units only every other cycle. The instructions issued to the fully-pipelined sub-units start executing immediately while the ones issued to the non-pipelined sub-units (e.g., divides and square root) get queued up if the sub-unit is busy. Also, two copies of unpipelined units, such as divides, could be provided in order to reduce possible performance degradation. It has been discovered that there would be no latency increase when sharing F-Boxes between the cores.

As previously mentioned, it has been discovered that some additional structures/techniques can be used in conjunction with various embodiments of the present invention to minimize the performance impact due to sharing. The previous embodiments disclosed a basic sharing policy of allocating shared resources to adjacent cores on alternate clock cycles, and hence gave an upper bound on the degradation for each kind of sharing. The term "intelligent arbitration heuristics" is used herein to define structures/techniques/software that minimize the performance impact due to sharing by actively determining the degree of sharing of the shared resources in an intelligent manner.

For I-Cache sharing, two techniques have been discovered for minimizing performance degradation when sharing instruction caches. One is conjoining-aware fetch-directed prefetching and the other is assertive I-Cache access.

In conjoining-aware fetch-directed prefetching, increased I-Cache access latency as well as reduced effective fetch bandwidth can be targeted simultaneously by having a modified fetch directed prefetching buffer for each core that can fetch from the memories (L2 or higher). Fetch directed prefetching (FDP) enhances fetch bandwidth by decoupling the branch predictor from the I-Cache and making it generate a prediction every cycle irrespective of whether fetch is stalled or not. The look-ahead target addresses are used to pre-fetch cache lines into a pre-fetch buffer. Fetching can be done simultaneously from the I-Cache as well the pre-fetch buffer.

The architecture is modified such that fetching can be done from either the unshared pre-fetch buffer or the shared I-Cache on those cycles when the I-Cache is accessible to the core, but only from the unshared pre-fetch buffer during the other cycles. The pre-fetch buffer now acts like a small, fully associative unshared L0 cache that lessens both the average instruction access latency as well as improves the fetch bandwidth due to its ability to feed instructions every cycle. But unlike an L0 cache, which would have to be large to supply sufficient bandwidth to be useful, a very small FDP buffer, due to its pre-knowledge of fetch targets, is more helpful.

Without assertive I-Cache access, the shared resource gets accessed evenly irrespective of the access needs of the individual cores. Instead, the control of a shared resource can be decided assertively based on the resource needs with assertive I-Cache access.

For example, whenever there is an I-Cache miss for one core, the other core can take control of the cache after miss detection. Generally, a miss can be detected in three cycles (this is a conservative estimate because miss detection involves just tag matching which takes less than one cycle). Once a miss is detected, the other core can acquire full control over the I-Cache in two cycles. The control would start getting shared again when the data returns.

For D-Cache sharing, two techniques have been discovered for minimizing degradation when sharing data caches. One is assertive D-Cache access and the other is input/output (I/O) port partitioning.

In assertive D-Cache access, whenever there is a memory (L2 or higher) miss on some data requested by a conjoined-core, if the data is determined to be on the right path, the conjoined-core relinquishes control over the shared D-Cache. There may be some delay between detection of the memory miss and the determination that the data is on the right path.

Once the conjoined-core relinquishes control, the other conjoined-core takes over full control and can then access the D-Cache whenever it wants. For example, control change can take three cycles. Once, the data comes back, the conjoined-core regains half the control after a three cycle delay.

In I/O port partitioning, one read/write (R/W) port of the two R/W ports on the D-Cache interface is statically assigned to each of the conjoined-cores and that will make the D-Cache accessible every cycle. This contrasts to the basic D-Cache sharing case where the D-Cache (and hence both the ports) can be accessed only every other cycle.

For F-Box sharing, assertive access for F-Box sharing involves a conjoined-core acquiring full control of the F-Box when the other conjoined-core is not using it. When both the conjoined-cores have floating point instructions to process, the control is shared.

For example, when a conjoined-core has not used the F-Box for the last eight cycles but its conjoined-core partner has, the other conjoined-core gets full control of it. The eight-cycle latency was determined as follows. There are five pipeline stages between fetch and execute and hence if the F-Box does not get used for five consecutive cycles by a particular conjoined-core, there is a good chance that there are no floating point instructions in the pipeline of the conjoined-core waiting to be issued. As a conservative estimate, it takes another three cycles for control transfer. Similarly, the conjoined-core can regain half the control of the shared F-Box within five cycles of a FP instruction getting fetched. Again, it would take not more than five cycles for a control signal to travel from the fetch stage to the execute stage that informs the scheduler of a fetched FP instruction. Control reclamation is again assumed to take three cycles.

Conjoined-core processor systems include physically adjacent conjoined-cores on a single-chip multiprocessor sharing one or more large functional units with associated hardware arbitration, as well as process scheduling software to assign processor systems to cores in a conjoining-aware manner. The above embodiments are based on the discovery that both the conjoined-cores would most likely not need all the shared resources at the same time to make the shared resources less than what was originally present without impacting performance significantly. These designs benefit from improved area efficiency leading to better yield, lower leakage, or better performance (if the saved area is used for other performance enhancing features). Specific embodiments discussed include F-Box sharing, I-Box and D-Box sharing, and memory interconnection network port sharing as well as intelligent arbitration heuristics for shared resources that can offset some of the downside from sharing. Other embodiments based on the above have also been discovered.

Figure 3:
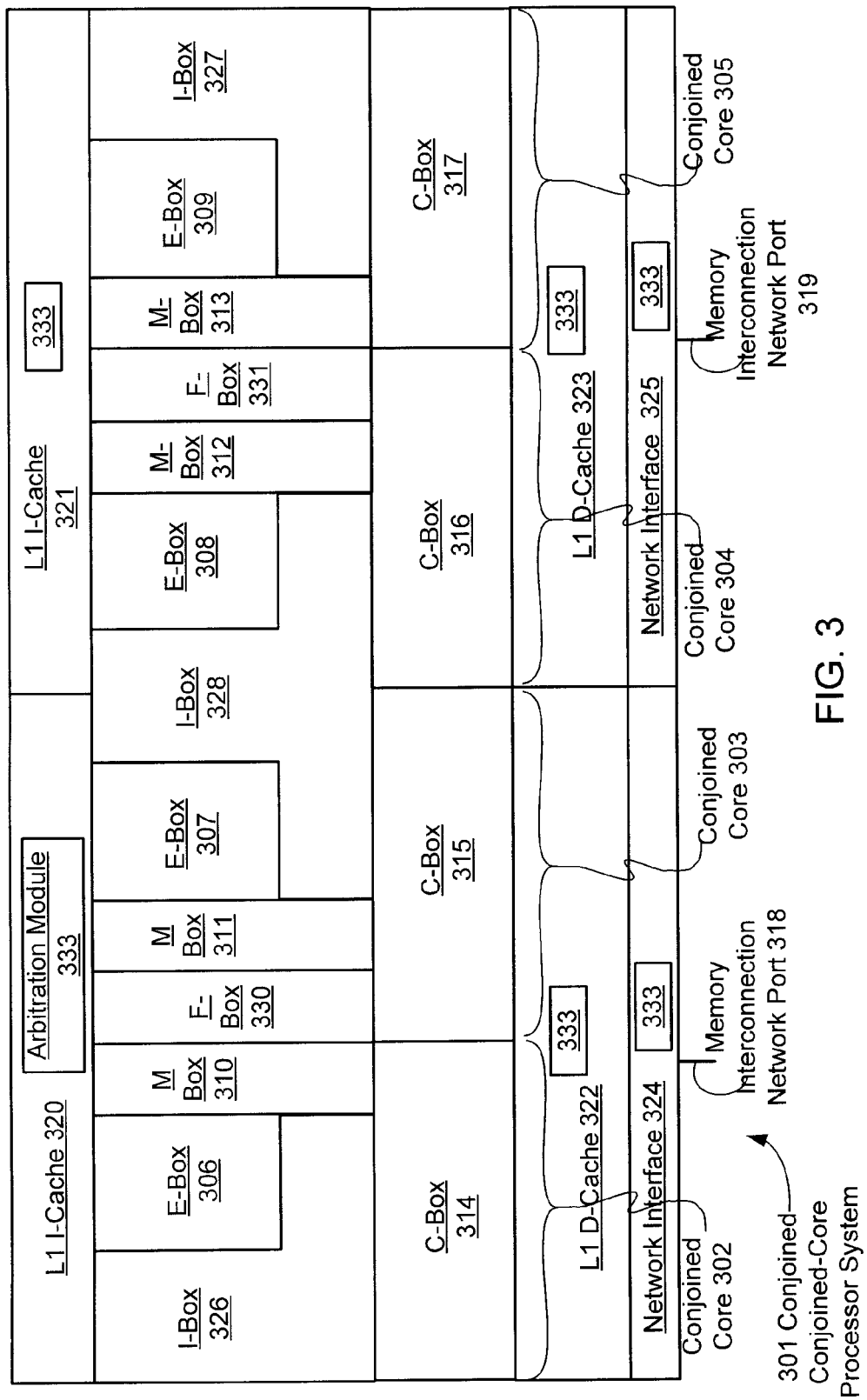
FIG. 3 is a block diagram of a conjoined-conjoined-core processor system in accordance with another embodiment of the present invention.

Referring now to FIG. 3, therein is shown a block diagram of a conjoined-conjoined-core processor system 301 in accordance with another embodiment of the present invention. The conjoined-conjoined-core processor system 301 involves dual processor pairs combined to form conjoined-core pairs where the individual unit of conjoining is a conjoined-core to begin with. The conjoined-conjoined-core processor system 301 is exemplary and illustrates four conjoined-cores 300 with conjoining applied two times iteratively. Other conjoining topologies are within the ordinary skill in the art based on the disclosure of the present invention.

The conjoined-conjoined-core processor system 301 has first through fourth conjoined-cores 302 through 306. The first through fourth conjoined-cores 302 through 305 respectively comprise execution units (E-Boxes) 306 through 309, memory management units (M-Boxes) 310 through 313, and cache controller units (C-Boxes) 314 and 317.

The first and second conjoined-cores 302 and 303 share and are conjoined to a L1 instruction cache (I-Cache) 320, a L1 data cache (D-Cache) 322, a network interface 324, and a memory interconnection network port 318.

The third and fourth conjoined-cores 304 and 305 share and are conjoined to a L1 instruction cache (I-Cache) 321, a L1 data cache (D-Cache) 323, a network interface 325, and a memory interconnection network port 319.

The first and fourth conjoined-cores 302 and 305 respectively have instruction units (I-Boxes) 326 and 327 and the second and third conjoined-cores 303 and 304 share and are conjoined to an instruction unit (I-Box) 328.

The first and second conjoined-cores 302 and 303 share and are conjoined to floating point unit (F-Box) 330 and the third and fourth conjoined-cores 304 and 305 share and are conjoined to floating point unit (F-Box) 331.

The shared resources each include an arbitration module 333 to arbitrate which conjoined-cores use the shared resources.

The lower-level conjoined-cores share the F-Box and the higher-level conjoined-cores share the I-Box. The higher-level conjoined sharing introduces some heterogeneity that will need to become an additional parameter for scheduling. The first and fourth conjoined-cores 302 and 305 each have an exclusive I-Box whereas the second and third conjoined-cores 303 and 304 have shared an I-Box. While this heterogeneity adds to the scheduling complexity, it can be used intelligently to avoid performance penalties from scheduling, particularly since I-Box sharing is likely to have more performance impact than F-Box sharing. Workloads that intensively use the I-Box can be scheduled on conjoined-cores that have exclusive I-Box access and workloads that do not intensively use the I-Box can be scheduled on a conjoined-core.

Intelligent process scheduling heuristics also include generalized workload-driven process scheduling and assignment policies in addition to the two simple methods for software process scheduling and assignment. For example, these policies are governed by the service-level agreements signed on by the individual services running on the different conjoined-cores. A workload that has a higher priority to complete gets higher priority in its use of the shared resources. Similarly, a scheduling heuristic that analyses workload patterns to come up with a model that better predicts future resource usage is used for sharing purposes. This leverages models that use past history to predict future resource usage behavior.

Figure 4:
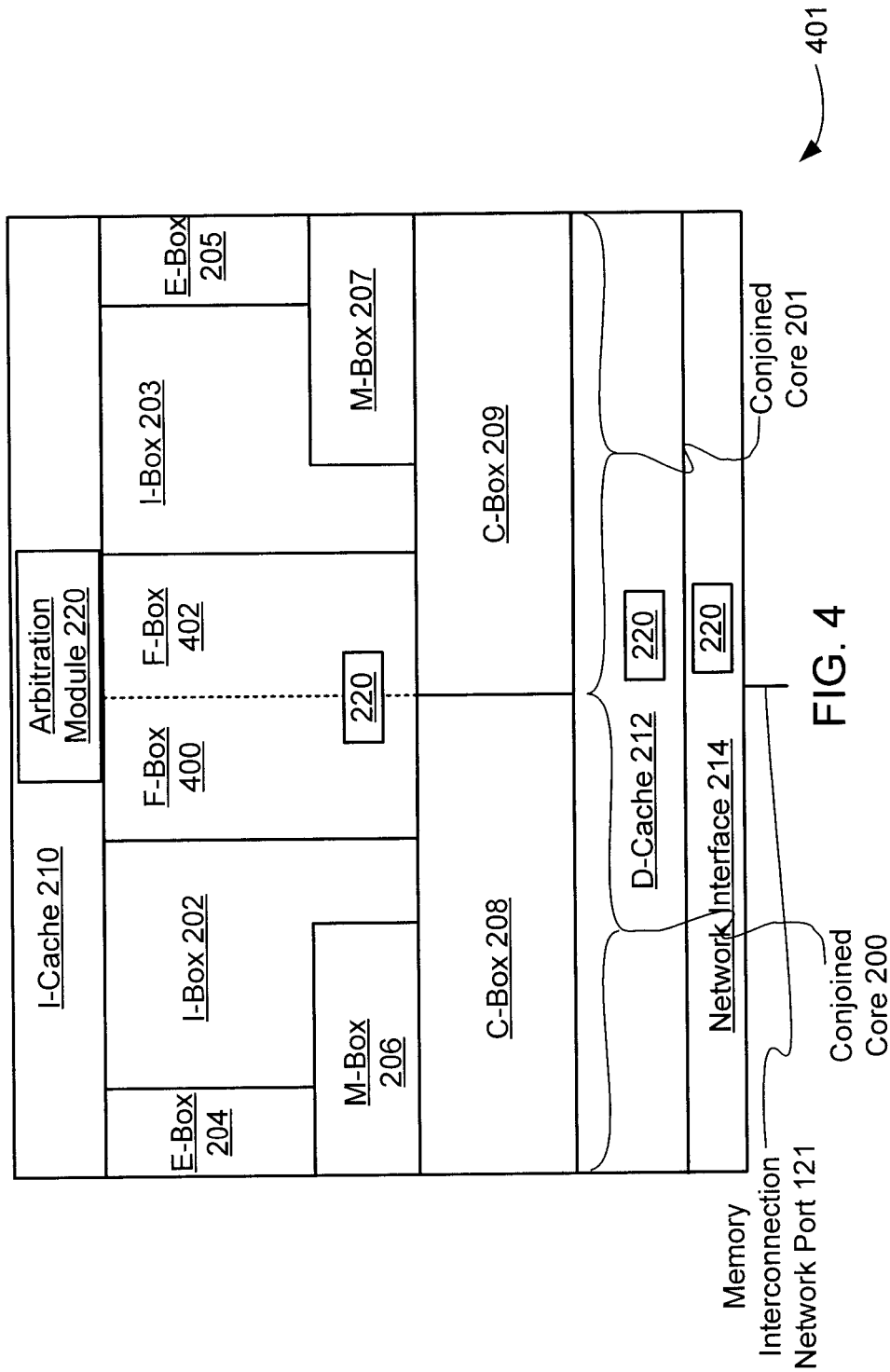
FIG. 4 is a block diagram of a low power conjoined-core processor system in accordance with a further embodiment of the present invention.

Referring now to FIG. 4, therein is shown a block diagram of a low power conjoined-core processor system 401 in accordance with a further embodiment of the present invention.

FIGS. 2 and 4 are alternative embodiments having some features in common so for clarity and ease of illustration and description thereof like features one to another are described with like reference numerals.

The area of the low power conjoined-core processor system 401 is almost the same as the area of the conjoined-core processor system 201 of FIG. 2. However, it has been discovered that the combined F-Box resources of F-Box 400 through 402 enables dynamic gating optimizations targeted at saving power across the conjoined pair. Based on workload usage across the first and second conjoined-cores 200 and 201, a software scheduler will turn off portions of the combined resource to save power. Compared to gating approaches that use individual conjoined-core resource usage to gate for power, gating across the sum of workloads across multiple conjoined-cores will improve the benefits from gating. When dynamic power is the main objective function being optimized for, this can even sometimes mean designs where the conjoined design can have a larger area without difficulty.

Figure 5:
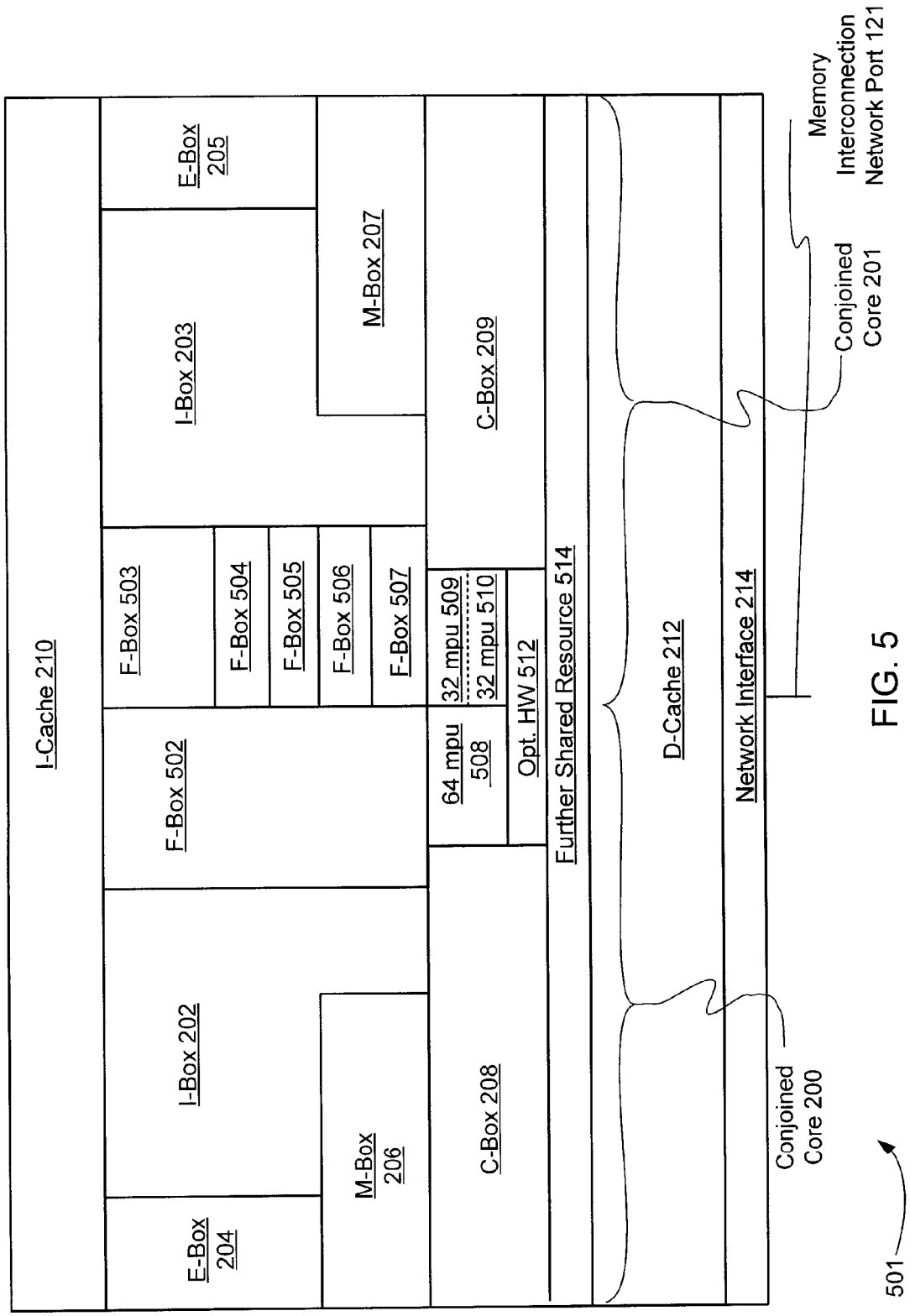
FIG. 5 is a block diagram of a heterogeneous conjoined-core processor system in accordance with an additional embodiment of the present invention.

Referring now to FIG. 5, therein is shown a block diagram of a heterogeneous conjoined-core processor system 501 in accordance with an additional embodiment of the present invention. FIGS. 2 and 5 are alternative embodiments having some features in common, so for clarity and ease of illustration and description thereof, like features one to another are described with like reference numerals.

The area of the heterogeneous conjoined-core processor system 501 is almost the same as the area of the conjoined-core processor system 101 of FIG. 2. However, it has been discovered that the combined F-Box resources of F-Box 502 through 507 of different sizes enables dynamic gating optimizations targeted at performance where shared-resources leverage heterogeneity. The shared resources include a heterogeneous mix of functional units, such as the F-Boxes 502 through 507, which optimize for the mix of computation that will be performed.

For example, a conjoined-core combining two 64-bit general-purpose media processing units could instead include one 64-bit general-purpose media processing unit 508 and two 32-bit other media processing units 509 and 510 for the same area. Compared to the first design where the two conjoined-cores together could perform only two computations at a given cycle, the new design allows the two conjoined-cores to perform three computations in a given cycle, albeit with restrictions on the mix of computations. The mix of computations across the workloads on the two conjoined-cores is unlikely to exhibit the level of synchronized functional unit utilization that will make this a problem.

It has been discovered that the notion of sharing resources is applicable in other cases as well, such as for non-topological sharing. One of the above embodiments disclosed simple topological sharing of resources, the goal being to reduce the complexity associated with additional wiring and associated cross-chip-communication latencies.

Non-topological sharing also applies to any resource that already has a long latency associated with its access. For example, a remote memory cache control logic typically handles requests that take tens or hundreds of cycles, and this could be easily shared even with additional latency additions because of cross-chip communication. Similarly, an occasionally used reconfigurable FPGA unit or a scratch memory buffer can be shared across all the chips in the system.

In another embodiment of the present invention, the heterogeneous conjoined-core processor system 501 has simpler conjoined-cores to leverage some high-area functionality briefly and avoid the problems associated with frequent context switching.

Figure 6:
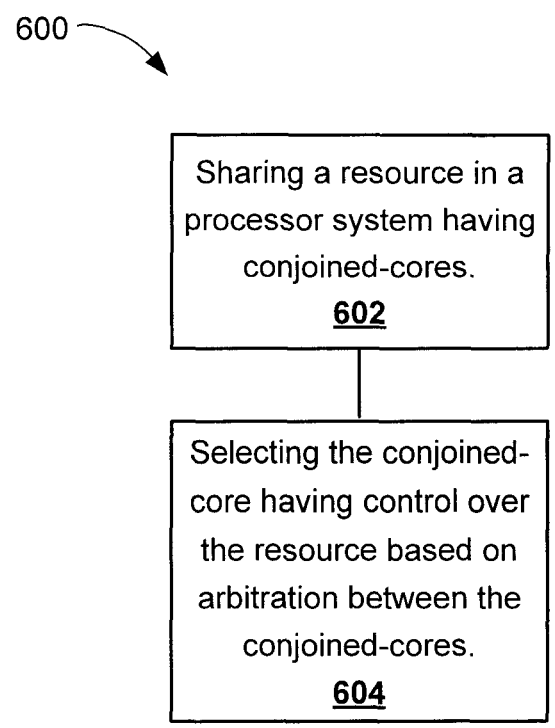
FIG. 6, is a flow chart of a processing system in accordance with an embodiment of the present invention.

Referring now to FIG. 6, therein is shown a flow chart of a processing system 600 in accordance with an embodiment of the present invention. The processing system 600 comprises: sharing a resource in a processor system for processing signals, the processor system having first and second conjoined-cores in a block 602; and selecting the conjoined-core having control over the resource based arbitration between the first and second conjoined-cores in a block 604.

Thus, the present invention provides selective sharing of resources between processing units in a chip multiprocessor and associated hardware arbitration and improved hardware design, in aid of improving an objective function.

The selective sharing includes, but is not limited to: topology, frequency of use, latency, contention avoidance, or a combination thereof.

The shared resource includes, but is not limited to: a F-Box, a memory interconnection network port, a L1 information cache, a L1 data cache, a media unit, or a combination thereof.

The processing units impacted include, but are not limited to: homogenous units, heterogeneous units, previously defined units, alterably definable units, or a combination thereof.

The associated hardware arbitration and software process scheduling and assignment include, but is not limited to: sharing, assertion, workload analysis, service level agreement, or a combination thereof.

The hardware design modification includes, but is not limited to, the addition of: optimization hardware 512 (e.g., a fetch buffer), further shared resource 514 (e.g., a configurable field programmable gate array, or a scratch memory), or a combination thereof.

The objective function includes, but is not limited to, improvements in: minimizing the area of the processor system; maximizing the performance of the processor system; minimizing the power utilization of the processor system; maximizing the reliability of the processor system, or a combination thereof.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the spirit and scope of the included claims. All matters hither-to-fore set forth herein or shown in the accompanying drawings are to be interpreted in an illustrative and non-limiting sense.

The invention claimed is:

1. A method comprising:
    sharing a resource in a processor system for processing signals, the processor system having first and second conjoined-cores that are conjoined with each other without a memory interconnection network between the conjoined-cores, wherein the resource is a cache memory;
    selecting one of the first and second conjoined-cores having control over the resource based on arbitration between the first and second conjoined-cores;
    scheduling, by an operating system, the sharing of the resource in the processor system, wherein scheduling the sharing of the resource considers different priorities of workloads running on the corresponding first and second conjoined-cores, and wherein scheduling the sharing of the resource further considers a scheduling heuristic that is according to patterns of the workloads used for predicting future resource usage;
    prefetching information from the cache memory into a prefetch buffer on behalf of the selected one of the first and second conjoined-cores;
    the selected conjoined-core fetching information from the prefetch buffer and the cache memory in cycles when the cache memory is accessible to the selected conjoined-core; and
    the selected conjoined-core fetching information only from the prefetch buffer during cycles when the cache memory is inaccessible to the selected conjoined-core.

2. The method of claim 1 wherein selecting one of the conjoined-cores having control over the resource is based on:
    dynamic sharing of the resource between the first and second conjoined-cores;
    frequency of use of the resource by the first and second conjoined-cores;
    latency of operation between the first and second conjoined-cores;
    contention avoidance between the first and second conjoined-cores; or
    a combination thereof.

3. The method of claim 1, wherein the first and second conjoined-cores are part of a first pair of conjoined-cores, wherein the resource has a first arbitrator module to control sharing of the resource by the first pair of conjoined-cores, and wherein the processor system further has a second pair of conjoined-cores, and the processor system has another resource shared by the second pair of conjoined-cores, wherein sharing of the another resource is controlled by a second arbitrator module in the another resource.

4. The method of claim 1, wherein the resource includes a heterogeneous mix of functional units that are shared by the first and second conjoined-cores.

5. The method of claim 1, wherein scheduling the sharing of the resource further considers policies specified by service-level agreements associated with the workloads running on corresponding first and second conjoined-cores.

6. A system comprising:
   a single-chip processor having first and second conjoined-cores including instruction units;
   a resource shared by the first and second conjoined-cores, the resource further comprising an arbitration module for arbitrating control of the resource between the first and second conjoined-cores, wherein the resource is a cache memory; and
   a prefetch buffer for each of the first and second conjoined-cores, wherein each prefetch buffer contains information prefetched from the cache memory,
   wherein a particular one of the first and second conjoined-cores is configured to retrieve information from the respective prefetch buffer and the cache memory in cycles when the cache memory is accessible by the particular conjoined-core, and the particular conjoined-core is configured to retrieve information only from the respective prefetch buffer in cycles when the cache memory is inaccessible to the particular conjoined-core; and
   an operating system having a scheduler to schedule sharing of the resource by the first and second conjoined-cores, wherein scheduling the sharing of the resource considers different priorities of workloads running on the corresponding first and second conjoined-cores, and
   wherein the scheduler is to schedule sharing of the resource further according to a scheduling heuristic that is according to patterns of workloads used for predicting future resource usage.

7. The system of claim 6, wherein the first and second conjoined-cores are part of a first pair of conjoined-cores, wherein the resource has a first arbitrator module to control sharing of the resource by the first pair of conjoined-cores, and wherein the system further has a second pair of conjoined-cores, and the processor system has another resource shared by the second pair of conjoined-cores, wherein sharing of the another resource is controlled by a second arbitrator module in the another resource.

8. The system of claim 6 wherein:
   the first and second conjoined-cores are mirrored conjoined-cores; and
   the resource is topologically adjacent and proximate the first and second conjoined-cores.

9. The system of claim 6 wherein the resource is:
   a floating point unit;
   an instruction cache;
   a data cache;
   a network interface;
   a memory interconnection network port;
   a media unit; or
   a combination thereof.

10. The system of claim 6 wherein the resource is a single resource for both the first and second conjoined-cores.

11. The system of claim 6 wherein the resource further comprises:
    a fetch buffer;
    a configurable field programmable gate array;
    scratch memory; or
    a combination thereof.

12. The system of claim 6 further comprising:
    a memory interconnection network port connected to the resource;
    a memory interconnection network connected to the memory interconnection network port; and
    a cache connected to the memory interconnection network.

13. The system of claim 6, wherein the scheduler is to schedule the sharing of the resource further based on policies specified by service-level agreements associated with workloads running on corresponding first and second conjoined-cores.

* * * * *